(12) United States Patent
Feng

(10) Patent No.: US 6,498,334 B2
(45) Date of Patent: Dec. 24, 2002

(54) INFRARED TRANSRECEIVER WITH ISOLATED ANALOG OUTPUT

(75) Inventor: Kai D. Feng, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 09/772,865

(22) Filed: Jan. 31, 2001

(65) Prior Publication Data

US 2002/0011556 A1 Jan. 31, 2002

(30) Foreign Application Priority Data

Jun. 27, 2000 (CA) ............................................. 2312516

(51) Int. Cl.[7] .............................................. H01J 40/14
(52) U.S. Cl. .............................. 250/214 A; 250/214 R; 330/308
(58) Field of Search ......................... 250/214 A, 214 R, 250/214 LA, 551; 330/308, 51

(56) References Cited

U.S. PATENT DOCUMENTS

| | | | |
|---|---|---|---|
| 3,702,447 A | * 11/1972 | Koning | ........................ 332/116 |
| 3,843,890 A | * 10/1974 | Anthony, Jr. et al. | ... 250/559.49 |
| 4,079,250 A | * 3/1978 | Jeffcoat | ................. 250/559.03 |
| 4,241,455 A | * 12/1980 | Eibner | ......................... 359/194 |
| 5,250,800 A | * 10/1993 | Sasaki | .................... 250/214 A |
| 5,869,857 A | * 2/1999 | Chen | .......................... 257/292 |

* cited by examiner

*Primary Examiner*—Stephone Allen
*Assistant Examiner*—Eric Spears
(74) *Attorney, Agent, or Firm*—Kevin M. Jordan, Esq.; McGinn & Gibb, PLLC

(57) ABSTRACT

An infrared (IR) transceiver having a receiver chain with an isolated analog output, includes a transmission gate and a unity gain buffer interposed between the amplifier output and an analog output pad. The transmission gate behaves as a switch, passing the analog output signal to the analog output pad only when an analog output is required. The unity gain buffer has a high input resistance, a low input capacitance, a unity gain and a low output impedance, so that the load of a digital signal processing (DSP) device or measuring instrument on the analog output pad is isolated and does not affect the performance of the receiver chain. Since the transfer rates of the transmission gate and the buffer are each unity, the analog output pad provides a high fidelity analog output signal to the output buffer.

24 Claims, 2 Drawing Sheets

INFRARED TRANSRECEIVER WITH ISOLATED ANALOG OUTPUT

BACKGROUND OF THE INVENTION

1. Field of the Invention

The present invention relates to transceivers, and more particularly to an infrared digital transceiver having an isolated analog output.

2. Description of the Related Art

Conventional digital infrared (IR) transceivers provide only a digital output. The receiver component of the transceiver converts infrared optical pulses into discrete electrical pulses for downstream processing.

FIG. 1 illustrates a conventional IR transceiver receiving chain. A photodiode (unreferenced) such as a PIN diode converts the optical energy from an infrared optical signal to an electric current. An amplifier 14 converts the electric current to voltage and magnifies the voltage. The output (analog signal) of the amplifier 14 is fed to a comparator input and a threshold voltage is applied to the other input of the comparator 16.

When the analog output signal of the amplifier 14 is greater than the threshold voltage, the comparator 16 emits a digital pulse. If the analog signal amplitude is smaller than or equal to the threshold voltage, the comparator output remains low. Thus, the comparator 16 hides small signal information within the analog profile of the optical signal output from the amplifier, including base line voltage, noise variance, system gain, etc. Thus, these parameters are inaccessible and untestable.

Hence, it is very difficult to apply digital signal processing (DSP) technology to IR communication in this conventional IR transceiver receiving chain. DSP is a very powerful method of improving communication quality, sensitivity and immunity, and the advantages of DSP are well established in other types of communication systems. However, DSP usually requires an analog signal in order to effect the analog-to-digital conversion, and a conventional IR transceiver is incapable of providing an analog signal without risking disruption of the operation of the receiver chain.

Furthermore, the conventional IR transceiver is difficult to test and debug. The analog component of the receiver chain is the core of an IR transceiver. However, because the analog signal is not accessible, when the device malfunctions or experiences product quality problems common diagnostic procedures are largely unavailable because the analog signal output of the amplifier is untestable.

Therefore, it would be advantageous to add an analog output to the receiver chain in an IR transceiver. However, since in an integrated circuit design the load capability of an amplifier is limited due to restrictions in the chip die size, this is significantly more complex than merely adding a connection from an analog output pad to the amplifier output. A direct connection from the amplifier output to an analog output pad would add an additional load on the amplifier output which would affect the receiver chain performance. The extra load results not only from the parasitic capacitance of the connection trace and the pad, but also from the input impedance of external components such as a DSP device or measurement instrument. If the additional load is too heavy, the IR transceiver performance will be degraded. In extreme cases (e.g., where a large capacitance is added to the amplifier output), a conventional IR transceiver will oscillate and system failure will result.

SUMMARY OF THE INVENTION

In view of the foregoing and other problems, disadvantages, and drawbacks of the conventional methods and structures, an object of the present invention is to provide an IR transceiver having a receiver chain with an isolated analog output, and a method of implementing an analog output in an IR receiver chain.

According to the invention, a transmission gate and unity gain buffer are interposed between the amplifier output and an analog output pad. The transmission gate behaves as a switch, passing the analog output signal to the analog output pad only when an analog output is required. For example, to use the analog output signal for digital signal processing, for a relatively strong signal, it is unnecessary to use digital signal processing and the transmission gate remains off. For a relatively weak signal, the transmission gate is turned on, thereby passing the analog signal to the unity gain buffer which provides an analog signal output to the DSP device. Thus, the transmission gate minimizes the effect of the isolated analog output, and further serves as a switch and multiplexer which allows a single isolated analog output to be connected to different test points through the use of multiple transmission gates.

The unity gain buffer preferably has a high input resistance, a low input capacitance, a unity gain and a low output impedance. Thus, the load of the DSP device or measuring instrument on the analog output pad is isolated by the unity gain buffer and the transmission gate, and does not affect the performance of the receiver chain.

In the preferred embodiment, the bandwidth of the transmission gate and the buffer is wider than that of the receiver chain, and since the transfer rate of the transmission gate (when active) is unity and the transmission rate of the buffer is unity, the analog output pad provides an analog signal substantially identical to the analog output of the amplifier.

In a first aspect, the present invention provides an isolated analog output circuit for a photoelectric transceiver having a photodiode emitting a current proportional to an intensity of an optical signal to produce an analog electrical signal, with the analog electrical signal being amplified by a photodiode signal amplifier to generate an analog input signal to the circuit. The circuit includes a buffer coupled to an analog output terminal, the buffer including a differential amplifier having a very high input impedance and substantially a unity gain. When the analog input signal is coupled to an input of the differential amplifier, the buffer outputs an analog output signal substantially identical to the analog input signal while isolating the photodiode signal amplifier from a load on the analog output terminal.

In a further aspect of the isolated analog output circuit, the differential amplifier includes a first symmetrical transistor pair including an input transistor and an output transistor having a common current source or impedance for signal coupling and operating point setting, the input and output transistors passing a current in direct proportion to an amplitude of an input voltage of the input transistor, a second symmetrical transistor pair including a pair of transistors, forming a current mirror and an active load of the first symmetrical transistor pair, connected between a voltage supply and the first symmetrical transistor pair, and an output stage including an output stage transistor and a resistor forming an impedance transfer and feedback network to the output transistor, an input terminal of the output stage transistor being connected to an output terminal of the first symmetrical transistor pair and an output terminal of the output stage transistor being connected to ground through the output stage resistor and to an input terminal of the output transistor of the first symmetrical transistor pair and to the analog output terminal. When the analog input signal is applied to the input terminal of the input transistor, a current flows through the input transistor and the second symmetrical transistor pair raises the output terminal voltage of the output transistor to maintain substantially identical currents through the input transistor and the output transistor, thereby forcing a current through the output transistor to match the current through the input transistor and providing an output analog signal substantially identical to the input analog signal.

In another aspect of the present invention, a photoelectric transceiver has a photodiode emitting a current proportional to an intensity of an optical signal to produce an analog electrical input signal, having an isolated analog output circuit. The output circuit includes a buffer coupled to an analog output terminal, the buffer including a differential amplifier having a very high input impedance and substantially a unity gain. When the analog input signal is coupled to an input of the differential amplifier, the buffer outputs an analog output signal substantially identical to the analog input signal while isolating the photodiode signal amplifier from a load on the analog output terminal.

In a further aspect of the photoelectric transceiver, the differential amplifier includes a first symmetrical transistor pair including an input transistor and an output transistor having a common current source or impedance for signal coupling and operating point setting, the input and output transistors passing a current in direct proportion to an amplitude of an input voltage of the input transistor, a second symmetrical transistor pair including a pair of transistors, forming a current mirror and an active load of the first symmetrical transistor pair, connected between a voltage supply and the first symmetrical transistor pair, and an output stage including an output stage transistor and a resistor forming an impedance transfer and feedback network to the output transistor, an input terminal of the output stage transistor being connected to an output terminal of the first symmetrical transistor pair and an output terminal of the output stage transistor being connected to ground through the output stage resistor and to an input terminal of the output transistor of the first symmetrical transistor pair and to the analog output terminal. When the analog input signal is applied to an input terminal of the first symmetrical transistor pair, a current flows through the input transistor and the second symmetrical transistor pair raises the output terminal voltage of the output transistor to maintain substantially identical currents through the input transistor and the output transistor, thereby forcing a current through the output transistor to match the current through the input transistor and providing an output analog signal substantially identical to the input analog signal.

In a further aspect of the invention, a transmission gate for selectively blocking or passing the analog input signal to the buffer is provided. The transmission gate includes at least one transistor which selectively blocks or passes the analog input signal responsive to a level of a gate voltage. In a preferred embodiment, the transmission gate includes a P-type FET and an N-type FET with sources (or drains) of the P-type FET and the N-type FET connected to the circuit input and drains (or sources) of the P-type FET and the N-type FET connected to an input of the buffer, a gate of one of the P-type FET and N-type FET being connected to a switching signal through an inverter. Since the source and drain of a P-type FET and an N-type FET are symmetrical and exchangeable, the connections of the sources and drains can be reversed without affecting the operation of the transmission gate.

In further aspects of the invention, the input and output transistors of the first symmetrical transistor pair respectively include a pair of N-type FETs, a gate of the input N-type FET being connected to the analog input signal, the second symmetrical transistor pair includes a pair of P-type FETs, the gates of the P-type FETs being connected to a drain of the input NFET, the input and output N-type FETs are grounded through a DC current source providing a DC operating current to the source coupled differential amplifier, and/or the output stage includes an N-type FET having a source providing the analog output signal and a feedback voltage to a gate of the output N-type FET.

The present disclosure relates to subject matter contained in Canadian Patent Application No. 2,312,516 filed on Jun. 27, 2000, which is expressly incorporated herein by reference in its entirety.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF THE
PREFERRED EMBODIMENT OF THE
INVENTION

Figure 1:
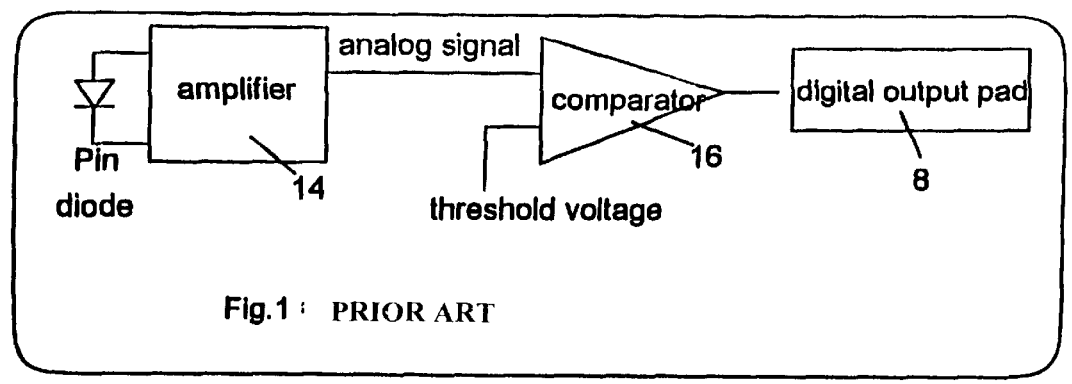
FIG. 1 is a block diagram of a conventional infrared transceiver receiving chain.
Figure 2:
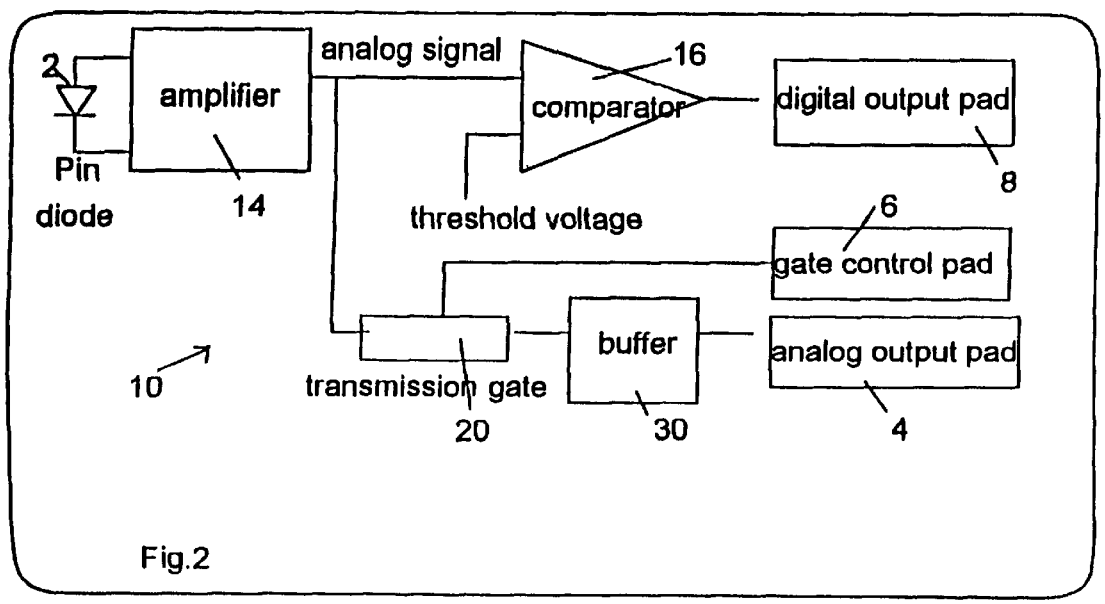
FIG. 2 is a block diagram of an infrared transceiver receiving chain 10 having an isolated analog output circuit 4 according to the present invention.
Figure 3:
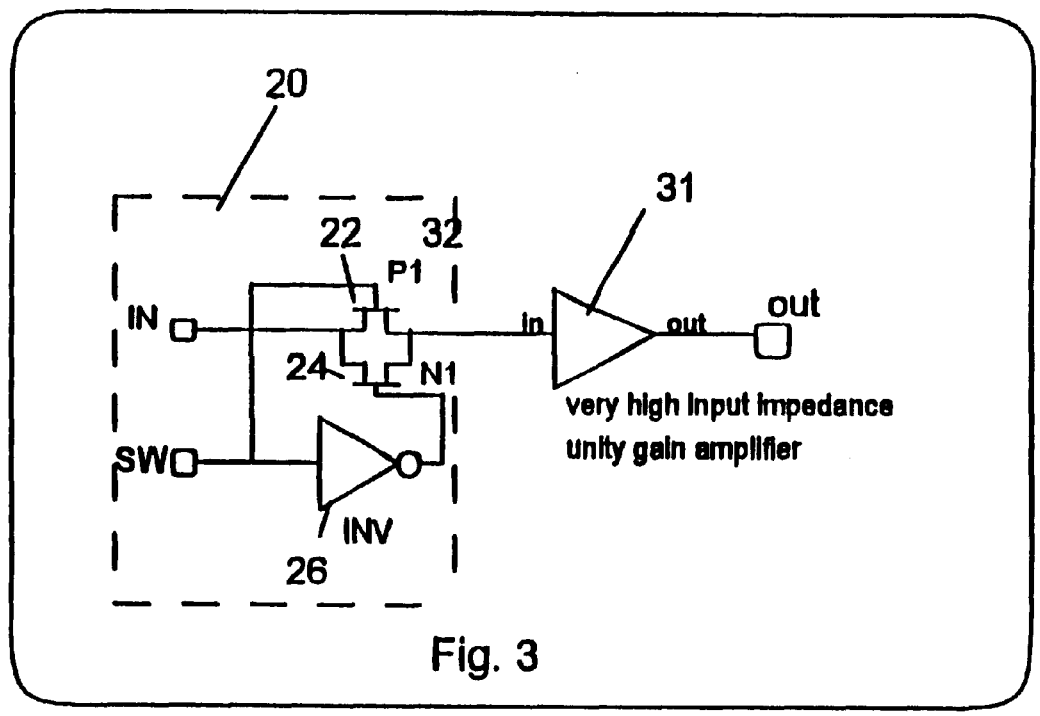
FIG. 3 is a schematic diagram of a preferred embodiment of a transmission gate 20 and unity gain buffer 30 in the receiving chain 10 of FIG. 2.
Figure 4:
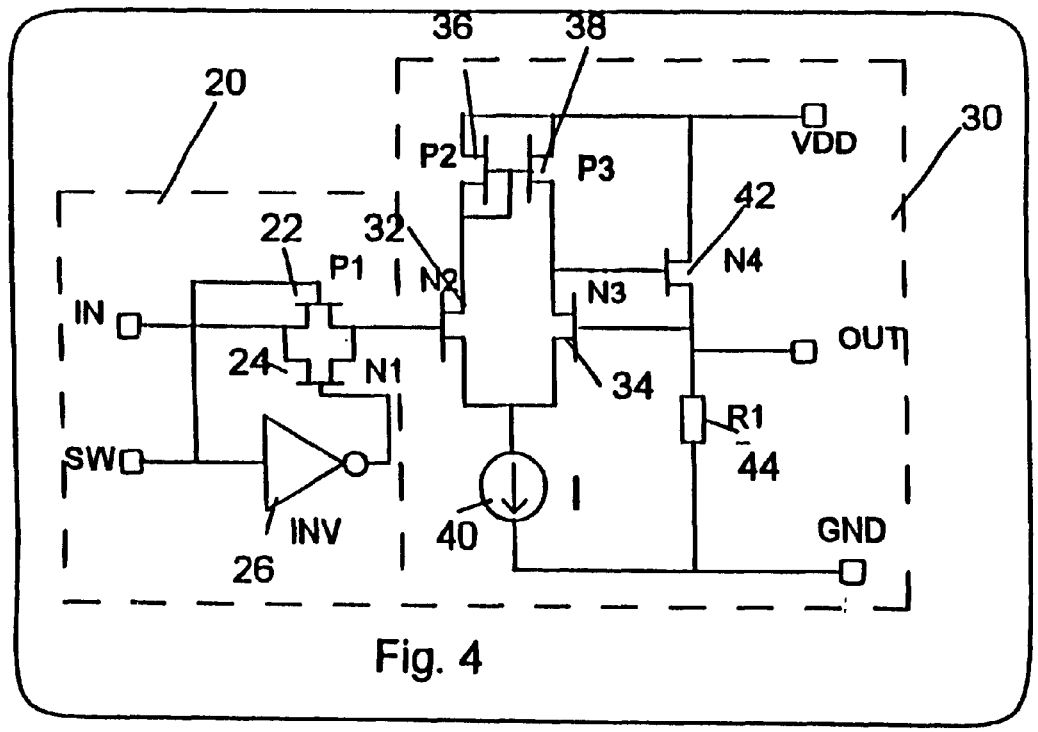
FIG. 4 is a schematic diagram showing a preferred embodiment of the unity gain buffer 30 of FIG. 3.

Turning now to the drawings and more specifically to FIGS. 2–4, a preferred embodiment of the present invention will be described.

FIG. 2 illustrates a receiver chain 10 in a photoelectric transceiver according to the invention. A photodiode such as a PIN diode 2 generates an electrical current proportional to the optical energy of an infrared optical signal received by the PIN diode 2. A conventional amplifier 14 converts the electric current to voltage and magnifies the voltage, which is output to comparator 16. A reference voltage at a selected threshold level is applied to the reference input of the comparator 16. When the analog output signal of the amplifier 14 exceeds the reference voltage, the comparator 16 emits a digital pulse for the duration of the interval during which the analog output signal of the amplifier 14 exceeds the reference voltage, which is transmitted to a digital device (not shown) through digital output pad 8. At all other times, the comparator output remains zero.

According to the present invention, a transmission gate 20 and unity gain buffer 30 are interposed between the output of the amplifier 14 and an analog output pad 4 for interfacing with an analog device (not shown), which may be a DSP device, a measurement or diagnostic instrument, etc. The transmission gate 20 and unity gain buffer 30 isolate the analog output pad 4 from the output of the amplifier 14, thus substantially eliminating the effects of both the parasitic capacitance of the analog output pad 4 and the input impedance of the analog device.

FIG. 3 illustrates a preferred embodiment of the transmission gate 20. The transmission gate 20, which is used in the case of weak analog input signals or analog measurements, includes P-type FET 22 and N-type FET 24, with the sources of the PFET 22 and the NFET 24 connected to the transmission gate input and the drains of the PFET 22 and the NFET 24 connected to the input of the buffer 30. As noted above, these connections can be reversed without affecting the operation of the transmission gate.

A control signal terminal SW controlled by a gate control pad 6 is connected to the gate of the PFET 22 and to the input of an inverter 26, the output of the inverter 26 being connected to the gate of the NFET 24. The PFET 22 and NFET 24 both may be very small (e.g., in the order of 6 $\mu m \times 1.2 \mu m$ (W×L)). Thus, when the transmission gate 20 is turned off, the input capacitance to ground is lower than 6 fF and the leakage current is less than 3 pA.

Thus, when the transmission gate control signal is in a high logic state, the logic state is high at the gate of the PFET 22 and low at the gate of the NFET 24, and both PFET 22 and NFET 24 are turned off and the analog output signal from the amplifier 12 is blocked. When the control signal is in a low logic state, the logic state is low at the gate of the PFET 22 and high at the gate of the NFET 24, and both PFET 22 and NFET 24 are turned on. Thus, the analog input signal from the output of the amplifier 12, which is connected to the sources of the FETs 22, 24, is passed to the unity gain buffer 30. Thus, the transmission gate 20 selectively passes the analog input signal to the analog output pad 4 responsive to the switching of the control signal. The transmission gate 20 not only minimizes the effect of the isolated analog output, but also serves as a switch and multiplexer so that, through the use of a plurality of transmission gates 20, a single isolated analog output can be connected to different test points by selective routing of the transmission gate control signal.

In the embodiment illustrated in FIG. 3, the unity gain buffer 30 includes a source coupling differential amplifier 31 having a very high input impedance (e.g., preferably, as a minimum, approximately one order of magnitude higher than the input impedance of the comparator 16, and preferably two orders of magnitude higher), which operates stably at a unity gain. The input of the differential amplifier 31 is coupled to the output of the transmission gate 20, and the output of the differential amplifier 31 is coupled to the analog output pad 4. Thus, the differential amplifier 31 isolates the load of a DSP device or measuring instrument on the analog output pad 4. Hence, the load does not affect the operation or performance of the receiver chain 10.

In a preferred embodiment of the unity gain buffer 30, as illustrated in FIG. 4, the source coupling differential amplifier includes a first symmetrical transistor pair respectively including input and output N-type FETs 32, 34, the source terminals of which are connected together, and a second symmetrical transistor pair including P-type FETs 36, 38, which form a current mirror active load of the first symmetrical transistor pair.

The input NFET 32 and output NFET 34 of the first symmetrical transistor pair have their drains respectively connected to the drains of the second symmetrical transistor pair PFETs 36, 38, the gate terminals of which are connected together and the source terminals of which are connected to the voltage supply $V_{dd}$. The sources of the NFETs 32, 34 are grounded through DC current source 40, which provides a DC operating current to the FETs 32, 34, 36 and 38 in the differential amplifier, and couples the signal from FET 32 to FET 34.

A feedback network is created by an output stage including N-type FET 42 having its drain terminal connected to the voltage supply $V_{dd}$, its gate terminal coupled to the drain of NFET 34, the analog output pad 4 being connected to its source terminal which is grounded through resistor 44, forming a source follower which reduces the output impedance of the unity gain buffer 30 and a strong negative feedback from the drain of FET 34 to its input (gate).

Thus, the current mirror formed by PFETs 38, 40 always forces the input and output NFETs 32, 34 of the first symmetrical transistor pair to have the same current, and simultaneously controls the input (gate) of the NFET 42 to force the output voltage (i.e., which is also the gate voltage of NFET 34) to follow the input voltage (i.e., the gate voltage of NFET 32 corresponding to the analog input signal). Thus, as long as NFET 32 is identical to NFET 34, a unity gain is obtained through the buffer 30, with an input current of less than 30 pA over a temperature range from −25 to 125° C. and an input capacitance as small as 0.1 pF.

In operation, with the transmission gate 20 switched on and the unity gain buffer 30 in a balance state, the gate voltages of NFETs 32, 34 are equal and the drain currents of the NFETs 32, 34 are the same as well due to the current mirror of PFETs 36, 38 which always keeps these two drain currents identical. Also, the sum of the drain current of NFETs 32, 34 must be the current of the current source 40.

When the input signal on the input (gate) of NFET 32 increases, the drain current of NFET 32 increases, but the current mirror formed by PFETS 36, 38 tries to force the drain current of NFET 34 to the level of the drain current of NFET 32 by increasing the drain voltage of NFET 34, which is enhanced by decreasing the drain current of NFET 34 due to the constant sum of the drain currents of NFETs 32, 34. The increase in the drain voltage of NFET 34 is fed back to the gate of NFET 34 through NFET 42, until the gate voltage of NFET 34 is equal to the gate voltage of NFET 32 and the drain current of NFET 34 is once again the same as the drain current of NFET 32, so that the unity gain buffer 30 reaches a new balance state. Since the gate of NFET 32 is the input of the unity gain buffer 30 and the gate of the NFET 34 is the output, the output voltage follows the input voltage and is held at the same level. NFET 43 and resistor 44 form a source follower so that the output impedance of the buffer 30 is low.

Thus, the unity gain buffer 30 provides a high input resistance, a low output capacitance, a unity gain and a low impedance, to isolate the load of the DSP device or measuring instrument on the analog output pad 4.

In the preferred embodiment, the bandwidth of the transmission gate 20 and the unity gain buffer 30 is wider than that of the receiver chain 10, thereby to avoid signal loss. Since the transfer rate of the active transmission gate is unity and the transmission rate of the buffer is unity, the analog output pad provides an analog signal substantially identical to the analog output of the amplifier.

"While the invention has been described in terms of a preferred embodiment, those skilled in the art will recognize that the invention can be practiced with modification within the spirit and scope of the appended claims."

Having thus described my invention, what I claim as new and desire to secure by Letters Patent is as follows:

1. An isolated analog output circuit for a photoelectric transceiver having a photodiode, a photodiode signal amplifier which generates an analog input signal, and a comparator, the isolated analog output circuit comprising:

a transmission gate coupled to said analog input signal; and a unity gain buffer coupled to said transmission gate and comprising a differential amplifier having an input impedance higher than an input impedance of said comparator, wherein said unity gain buffer outputs an analog output signal substantially identical to the analog input signal while isolating the photodiode signal amplifier from a load on the analog output circuit.

2. The isolated analog output circuit of claim 1, wherein said transmission gate selects one of blocking and passing the analog input signal.

3. The isolated analog output circuit of claim 1, wherein the differential amplifier comprises:

a first symmetrical transistor pair comprising an input transistor and an output transistor having one of a common current source and common impedance, for signal coupling and operating point setting, the input and output transistors passing a current in direct proportion to an amplitude of an input voltage of the input transistor;

a second symmetrical transistor pair comprising a pair of transistors, forming a current mirror and an active load of the first symmetrical transistor pair, connected between a voltage supply and the first symmetrical transistor pair; and an output stage comprising an output stage transistor and a resistor forming an impedance transfer and feedback network to the output transistor, an input terminal of the output stage transistor being connected to an output terminal of the first symmetrical transistor pair and an output terminal of the output stage transistor being connected to ground through the output stage resistor and to an input terminal of the output transistor of the first symmetrical transistor pair and to the analog output terminal, wherein, when the analog input signal is applied to an input terminal of the first symmetrical transistor pair, a current flows through the input transistor and the second symmetrical transistor pair raises the output terminal voltage of the output transistor to maintain substantially identical currents through the input transistor and the output transistor, thereby forcing a current through the output transistor to match the current through the input transistor and providing an output analog signal substantially identical to the input analog signal.

4. The isolated analog output circuit of claim 3, wherein said transmission gate selects one of blocking and passing the analog output signal.

5. The isolated analog output circuit of claim 4, wherein the transmission gate comprises at least one transistor which selectively blocks or passes the analog input signal responsive to a level of a gate voltage.

6. The isolated analog output circuit of claim 5, wherein the transmission gate comprises a P-type FET and an N-type FET with sources of the P-type FET and the N-type FET connected to the circuit input, and drains of the P-type FET and the N-type FET connected to an input of the buffer, a gate of one of the P-type FET and the N-type FET being connected to a switching signal through an inverter.

7. The isolated analog output circuit of claim 4, wherein the input and output transistors of the first symmetrical transistor pair respectively comprise a pair of N-type FETs, a gate of the input N-type FET being connected to the analog input signal.

8. The isolated analog output circuit of claim 7, wherein the second symmetrical transistor pair comprises a pair of P-type FETs, gates of the P-type FETs being connected to a drain of the input N-type FET.

9. The isolated analog output circuit of claim 8, wherein the input and output N-type FETs are grounded through a DC current source providing a DC operating current to the source coupled differential amplifier.

10. The isolated analog output circuit of claim 9, wherein the output stage comprises an N-type FET having a source providing the analog output signal and feedback voltage to a gate of the output N-type FET.

11. The isolated analog output circuit according to claim 1, wherein said photodiode comprises a PIN diode.

12. The isolated analog output circuit according to claim 11, wherein said signal amplifier comprises a current amplifier.

13. The isolated analog output circuit according to claim 1, wherein when a transmission gate is activated, said differential amplifier has an input current which is less than 30 pA and an input capacitance which is at least 0.1 pF, and when said transmission gate is not activated said differential amplifier has a leakage current which is less than 3 pA and an input capacitance which is less than 6 fF.

14. A photoelectric transceiver including:

a photodiode for emitting a current proportional to an intensity of an optical signal to produce an analog electrical input signal;

a signal amplifier connected to said photodiode and generating an analog input signal;

a comparator which receives said analog input signal; and an isolated analog output circuit comprising:

a transmission gate coupled to said analog input signal; and a unity gain buffer coupled to said transmission gate, the unity gain buffer having an input impedance higher than an input impedance of said comparator, wherein the unity gain buffer outputs an analog output signal substantially identical to the analog input signal while isolating the signal amplifier from a load on the analog output circuit.

15. The photoelectric transceiver of claim 14, further comprising a transmission gate for selectively blocking or passing the analog input signal.

16. The photoelectric transceiver of claim 14, wherein the differential amplifier comprises:

a first symmetrical transistor pair comprising an input transistor and an output transistor having one of a common current source and common impedance, for signal coupling and operating point setting, the input and output transistors passing a current in direct proportion to an amplitude of an input voltage of the input transistor;

a second symmetrical transistor pair comprising a pair of transistors, forming a current mirror and an active load of the first symmetrical transistor pair, connected between a voltage supply and the first symmetrical transistor pair; and an output stage comprising an output stage transistor and a resistor forming an impedance transfer and feedback network to the output transistor, an input terminal of the output stage transistor being connected to an output terminal of the first symmetrical transistor pair and an output terminal of the output stage transistor being connected to ground through the output stage resistor and to an input terminal of the output transistor of the first symmetrical transistor pair and to the analog output terminal, wherein, when the analog input signal is applied to an input terminal of the first symmetrical transistor pair, a current flows throught the input transistor and the second symmetrical transistor pair raises the output terminal voltage of the output transistor to maintain substantially identical currents through the input transistor and the output transistor, thereby forcing a current through the output transistor to match the current through the input transistor and providing an output analog signal substantially identical to the input analog signal.

17. The photoelectric transceiver of claim 16, further comprising a transmission gate for selectively blocking or passing the analog input signal.

18. The photoelectric transceiver of claim 17, wherein the transmission gate comprises at least one transistor which selectively blocks or passes the analog signal responsive to a level of a gate voltage.

19. The photoelectric transceiver of claim 18, wherein the transmission gate comprises a P-type FET and an N-type FET with sources of the P-type FET and the N-type FET connected to the circuit input, and drains of the P-type FET and the N-type FET connected to an input of the buffer, a gate of one of the P-type FET and N-type FET being connected to a switching signal through an inverter.

20. The photoelectric transceiver of claim 17, wherein the input and output transistors of the first symmetrical transistor pair respectively comprise a pair of N-type FETs, a gate of the input N-type FET being connected to the analog input signal.

21. The photoelectric transceiver of claim 20, wherein the second symmetrical transistor pair comprises a pair of P-type FETs, the gates of the P-type FETs being connected to a drain of the input N-type FET.

22. The photoelectric transceiver of claim 21, wherein the input and output N-type FETs are grounded through a DC current source providing a DC operating current to the source coupled differential amplifier.

23. The photoelectric transceiver of claim 22, wherein the output stage comprises an N-type FET having a source providing the analog output signal and a feedback voltage to a gate of the output N-type FET.

24. An optical transceiver including:

a receiver chain having an amplifier and an isolated analog output circuit, said isolated analog output circuit comprising:

a transmission gate and a unity gain buffer interposed between the amplifier output and an analog output pad, wherein said transmission gate passes an analog output signal to the analog output pad only when an analog output is selectively required, such that a load on the analog output pad is isolated and does not affect performance of the receiver chain.

* * * * *